(12) United States Patent
Lorenz et al.

(10) Patent No.: US 8,331,681 B1
(45) Date of Patent: Dec. 11, 2012

(54) GENERATING TYPEFACES THROUGH IMAGE ANALYSIS

(75) Inventors: Jon Lorenz, San Francisco, CA (US); Marcos Weskamp, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1083 days.

(21) Appl. No.: 12/258,223

(22) Filed: Oct. 24, 2008

(51) Int. Cl.
*G06K 9/62* (2006.01)

(52) U.S. Cl. ........................................ 382/187; 345/471

(58) Field of Classification Search .................. None
See application file for complete search history.

(56) References Cited

U.S. PATENT DOCUMENTS

| | | | | |
|---|---|---|---|---|
| D96,323 | S * | 7/1935 | Lister et al. | D18/27 |
| 5,398,306 | A * | 3/1995 | Karow | 358/1.11 |
| 5,539,868 | A * | 7/1996 | Hosoya et al. | 345/471 |
| 5,586,242 | A * | 12/1996 | McQueen et al. | 345/467 |
| 5,754,187 | A * | 5/1998 | Ristow et al. | 345/469 |
| 5,805,783 | A * | 9/1998 | Ellson et al. | 345/468 |
| 5,995,086 | A * | 11/1999 | Dowling et al. | 345/467 |
| 6,785,649 | B1 * | 8/2004 | Hoory et al. | 704/235 |
| 6,870,535 | B2 * | 3/2005 | Hill et al. | 345/467 |
| 7,659,914 | B1 * | 2/2010 | Rostami | 345/636 |
| 2001/0021937 | A1 * | 9/2001 | Cicchitelli et al. | 707/517 |
| 2004/0114804 | A1 * | 6/2004 | Tanioka | 382/187 |
| 2005/0140675 | A1 * | 6/2005 | Billingsley et al. | 345/440 |
| 2005/0270291 | A1 * | 12/2005 | Forte | 345/467 |
| 2007/0195096 | A1 * | 8/2007 | Voorhees et al. | 345/467 |
| 2008/0235606 | A1 * | 9/2008 | Brown et al. | 715/764 |

OTHER PUBLICATIONS

"SigMaker"; Oct. 5, 2008; http://www.fontlab.com/font-utility/sigmaker, 5 pages.
"SigMaker 3 for Windows User Manual"; Sasha Petrov, Adam Twardoch, Ted Harrison, Yuri Yarmola, editors; Aug. 16, 2007; http://www.fontlab.com/, 39 pages.
"Typeface"; Wikipedia; Oct. 5, 2008; http://en.wikipedia.org/wiki/Typeface, 10 pages.
"Font"; Wikipedia; Oct. 5, 2008; http://en.wikipedia.org/wiki/font, 5 pages.

* cited by examiner

*Primary Examiner* — Brian P Werner
(74) *Attorney, Agent, or Firm* — Kilpatrick Townsend & Stockston LLP (57) ABSTRACT

Generating typefaces from various images is disclosed in which any image, whether from a still photograph or a video frame, is analyzed to find various patterns existing in the image. These patterns may be evident from the image itself or may be discovered by applying various transforms to the image. The patterns obtained from the image are then compared against existing characters in existing typefaces in trying to find correlations between individual patterns and individual characters of the existing typefaces. When correlations are found, the character image representing the pattern that resembles the existing typeface character is analyzed for various typeface properties, such as weight, width, angle, and the like. Using these determined typeface properties and the visual elements of the character image, an entire set of characters making up a new typeface is generated.

30 Claims, 5 Drawing Sheets

GENERATING TYPEFACES THROUGH IMAGE ANALYSIS

TECHNICAL FIELD

The presently disclosed teachings relate, in general, to generating typefaces, and, more particularly, to generating typefaces through image analysis.

BACKGROUND

The design of typefaces, referred to as type design, has been practiced likely since the development of the printing press. Typographers create a particular graphic representation of alphabet letters, numerals, punctuation marks, and any other useful ideograms and symbols in order to generate a typeface. The typeface defines a similar appearance of the various graphical representations of the characters of the typeface. These individual graphical representations of characters or graphemes are typically referred to as glyphs. This collection of glyphs that make up the set of characters or graphemes of the typeface are then generally named, e.g., Times New Roman, Courier, Helvetica, and the like, and used to present printed material in a desired look and feel.

With the advent of computers and computer graphics, typefaces have been extended to computer-generated typefaces and fonts and has provided greater access to a wider variety of such typefaces. Because access to multiple typefaces has increased with computers and the general description used in computers is the selections of various "fonts," font has also become synonymous with typefaces. However, a font is generally considered one particular size and/or style of typeface. For example, the typeface Times New Roman encompasses many different fonts, such as 10 point Times New Roman, 12 point Times New Roman, 12 point Times New Roman Bold, and the like. Each different size, i.e., 10 pt vs. 12 pt, or style, i.e., bold, is considered a separate font. In general application, though, a typeface is considered essentially to be the same as a font.

In designing a typeface, whether for computer use or otherwise, various properties are taken into consideration: (1) weight, which is the thickness of the character outlines; (2) width, which is the width of the character; (3) style or angle, which is the angle that the character forms when ascending from the baseline of the page; (4) proportionality, which determines whether the glyphs are proportional, i.e., have varying widths, or are non-proportional, i.e., having fixed widths, also referred to as monospaced or fixed-width; and (5) serifs, which are decorative flourishes that may be added at the end of the character stroke or glyph. Typefaces may be serif or sans-serif (meaning without serifs). In general, serif typefaces are considered to be easier to read in long presentations of text, such as in a book, page, or manuscript, while serif typefaces may be more clear, thus, are typically used in signs, posters, and the like.

There are very many different typefaces that may be selected for various uses depending on the presentation that a particular author desires to achieve. Serif and sans serif typefaces are generally used for regular printing of text, whether in a large presentation of text or a short presentation. Script typefaces typically simulate handwriting, cursive, or calligraphy, and may be used in a more decorative sense. Ornamental typefaces are designed with visual characteristics that are intended to evoke a certain feeling in the intended reader. For example, a Wild West typeface may include what is thought to be the typical visual and graphical characteristics of the glyphs and printing that was used in the old West. Presenting type in such a typeface would evoke a feeling in the reader of relating to the old West.

Ornamental typefaces may also be used to add a certain artistic flourish or individuality to the typeface. With the increased capabilities of computers, it has become more easy for non-type designers to design or create their own typeface using individually selected glyphs or graphics as an addition to an existing typeface. For example, Fontlab, Ltd's SIGMAKER™ is a software tool that allows users to create a font or typeface that incorporates all or part of an image that may represent a particular letter, number, punctuation, or the like. SIGMAKER™ allows the user to select the font that he or she wishes to add to, prepare a glyph using any particular image, such as a photograph, signature, logo, or the like, select the character position in which to use this glyph within the font or typeface, and save a modified version of the font which includes the user-created glyph. In subsequent uses of this modified font, the glyph that the user created using the image will be substituted for the character that it replaced. While this typeface modification system provides added flexibility and customizability to typefaces, it is still limited in its application and requires a considerable amount of effort to create.

BRIEF SUMMARY

Representative embodiments of the present teachings are directed to finding and generating characters in an image to create a typeface based on the visual elements of the image. Any image, whether from a still photograph or a video frame, is analyzed to find various patterns existing in the image. These patterns may be evident from the image itself or may be discovered by applying various transforms to the image. The patterns obtained from the image are then compared against existing characters in existing typefaces in trying to find correlations between individual patterns and individual characters of the existing typefaces. When correlations are found, the character image representing the pattern that resembles the existing typeface character is analyzed for various typeface properties, such as weight, width, angle, and the like. Using these determined typeface properties and the visual elements of the character image, an entire set of characters making up a new typeface is generated.

Additional representative embodiments of the present teachings are directed to methods that include identifying one or more patterns in an image, comparing the identified patterns with a plurality of existing characters of one or more existing typefaces, selecting a character image from the identified patterns responsive to the comparing, analyzing the selected character image for a plurality of typeface properties, and generating a plurality of new characters for a new typeface using the typeface properties.

Further additional representative embodiments of the present teachings are directed to systems that are made up of storage memory coupled to a processor, and a typeface generation application stored in the storage memory. When executed by the processor, the typeface generation application includes a typeface database stored in the storage memory, wherein the typeface database includes one or more existing typefaces. The typeface generation application further includes a pattern recognizer component configured to analyze an image for one or more patterns and compare each of those patterns against a plurality of characters making up the existing typefaces. The pattern recognizer component selects a character image corresponding to one of the patterns that is closest in structure to a corresponding one of the existing typeface characters. The typeface generation application also includes a typeface generator component configured to analyze a plurality of typeface characteristics of the character image and generate a plurality of new characters for a new typeface using the character image and the typeface characteristics.

Still further representative embodiments of the present teachings are related to computer program products having a computer readable medium with computer program logic recorded thereon. These computer program products include code for identifying one or more patterns in an image, code for comparing the one or more patterns with a plurality of existing characters of one or more existing typefaces, code for selecting a character image from the identified patterns responsive to results from executing the code for comparing. The computer program products also include code for analyzing the selected character image for a plurality of typeface properties and code for generating a plurality of new characters for a new typeface using the plurality of typeface properties.

The foregoing has outlined rather broadly the features and technical advantages of the present teachings in order that the detailed description that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the disclosure as set forth in the appended claims. The novel features which are believed to be characteristic of the teachings disclosed herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following descriptions taken in conjunction with the accompanying drawing, in which.

DETAILED DESCRIPTION

Figure 1:
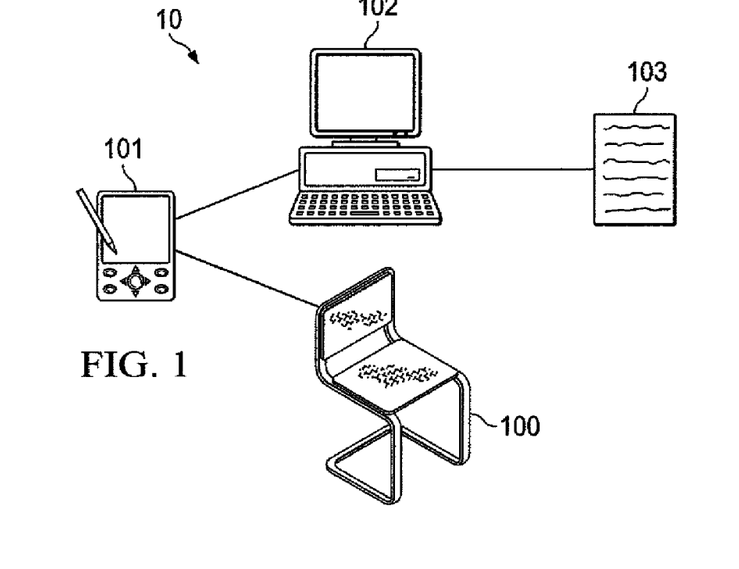
FIG. 1 is a diagram illustrating a typeface generation system configured according to one embodiment of the present teachings.

FIG. 1 is a diagram illustrating typeface generation system 10 configured according to one embodiment of the present teachings. While walking through a museum, a user sees a Breuer B5 chair, chair 100, on display. The user is planning an event to be hosted at the museum and desires to create a font or typeface that would be reflective of the museum or of the event at the museum. Using mobile camera phone 101, the user takes a picture of chair 100 and sends the picture to his or her desktop computer, computer 102. After returning to computer 102, the user executes typeface generation application 40 (FIG. 4), which analyzes the image of chair 100 and returns or outputs a complete typeface that is based on some visual aspect of the image to the user. Using this newly created typeface, the user creates event invitation 103 that will be send to each of the invitees.

Figure 2A:
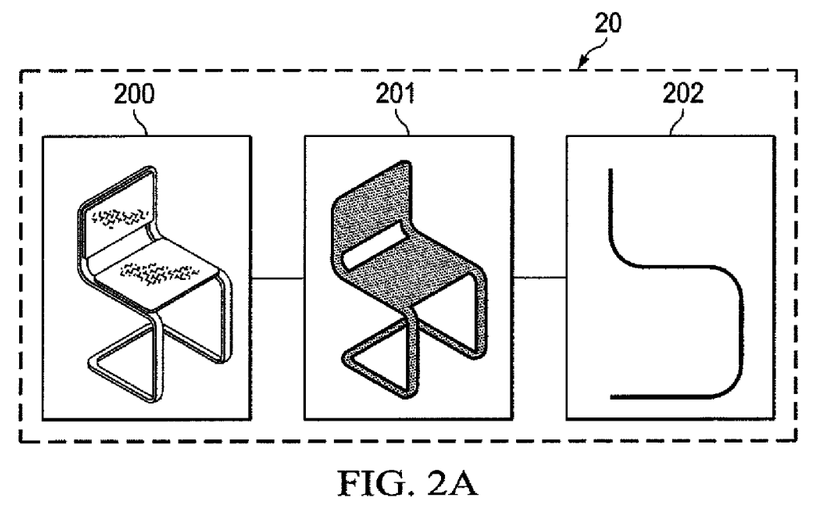
FIG. 2A is a graphical flow diagram illustrating an idealized representation of a character recognition process (CRP) configured according to one embodiment of the present teachings.

FIG. 2A is a graphical flow diagram illustrating an idealized representation of character recognition process (CRP) 20 configured according to one embodiment of the present teachings. The flow of CRP 20 begins with image 200. Image 200 corresponds to the picture of chair 100 (FIG. 1) taken by mobile camera phone 101 (FIG. 1). In attempting to discern a shape or pattern that may be transformed into a character or glyph for a new typeface, any number of transformations, such as color filters, color swapping, Fourier transformation, or other such image processing transformations, may be applied to image 200. Using the results of these transformations, the system operating CRP 20 compares any resulting patterns or shapes to a database of different existing characters or typefaces. This comparison will result in one or more of the patterns being selected to represent a corresponding character or glyph. Silhouetted image 201 results after a silhouetting transform is applied to image 200. The silhouetting transform basically turns the subject of image 200 into a silhouette. Using silhouetted image 201, the system operating CRP 20 selects a shape, character shape 202, from silhouetted image 201 that provides a high degree of correlation to one or more of the characters or glyphs found in the typeface database. CRP 20 then creates the letter 'b' using this shape selected from image 200.

Figure 2B:
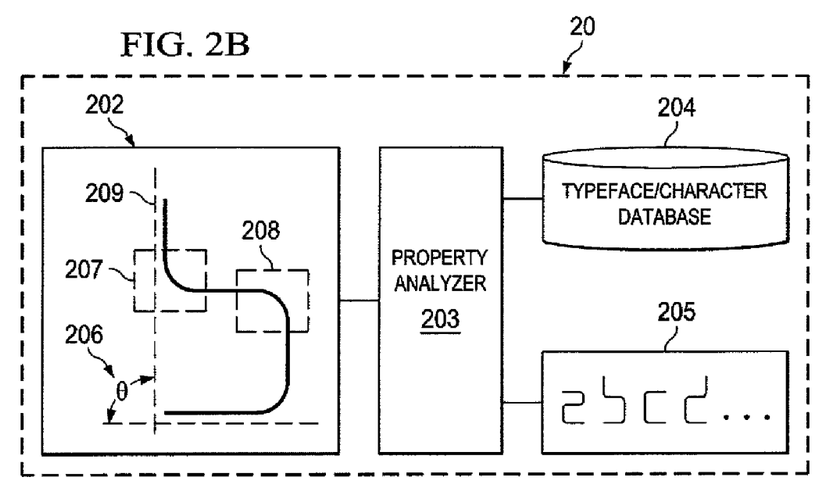
FIG. 2B is a graphical flow diagram illustrating further processing within the idealized CRP of FIG. 2A configured according to one embodiment of the present teachings.

FIG. 2B is a graphical flow diagram illustrating further processing within the idealized CRP 20 configured according to one embodiment of the present teachings. When character shape 202 is selected by the system operating CRP 20, an analysis by property analyzer 203 of the various typographic characteristics and properties begins on character shape 202. These typographic characteristics and properties will then be used by the system to generate a complete typeface of all glyphs, characters, numbers, symbols, punctuations, and the like, as identified by property analyzer 203 from typeface/character database 204. Property analyzer 203 analyzes angle θ 206 that character shape 202 makes with a horizontal baseline. It also analyzes the curves in the letter shape at convex curve 207 and concave curve 208. Moreover, open backside 209 is analyzed to determine how a typeface based on this shape of character shape 202 may provide the backsides to various letters.

As character shape 202 resulted from a picture of a Breuer B5 chair, chair 101 (FIG. 1), the characteristic shapes provide a visual appearance of having a tubular quality with open ends and a thin, clean, and minimal shape. Thus, property analyzer 203 begins to generate additional glyphs and characters that share this overall general appearance. Using the properties and characteristics determined from analyzing character shape 202, property analyzer 203 determines the appropriate weight, width, style, and other such typefaces properties that reflect the characteristics and properties found in character shape 202. The generation of these glyphs and characters result in typeface 205. The user may then use this typeface to create the invitations to the museum event, in which the style and appearance of the typeface will be reminiscent of the Breuer B5 chair exhibited at the museum. Moreover, the entire typeface is generated by the user simply by taking a picture of chair 101 (FIG. 1) and sending it to be processed in CRP 20.

Figure 3:
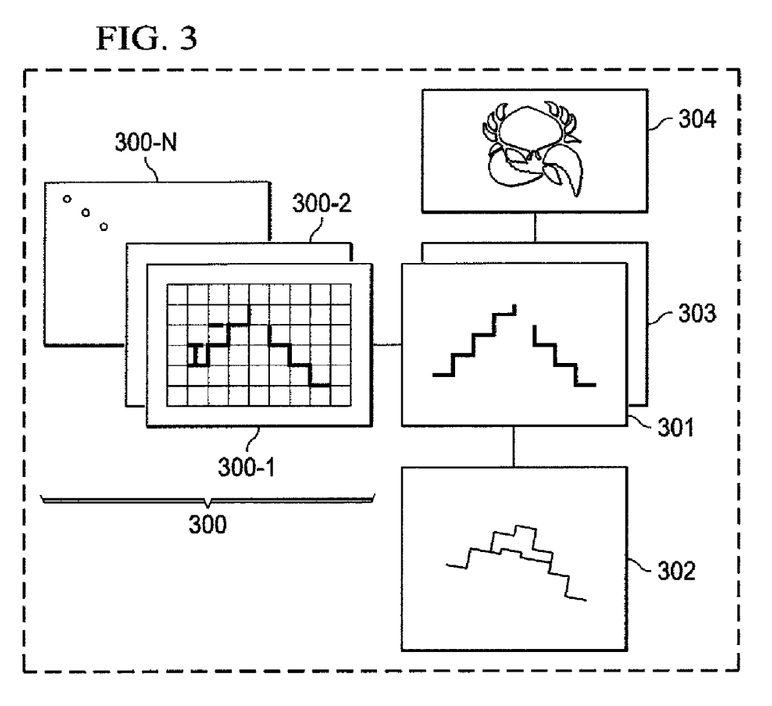
FIG. 3 is a graphical flow diagram illustrating an idealized representation of a CRP configured according to one embodiment of the present teachings.

FIG. 3 is a graphical flow diagram illustrating an idealized representation of CRP 30 configured according to one embodiment of the present teachings. Instead of operating from a single image, CRP 30 operates using frames 300 from a movie video. Stepping through each of frames 300-1 through 300-N, CRP 30 performs various transforms to the images on the frames and compares those against known characters and glyphs found in a character database, such as typeface/character database 204 (FIG. 2B). Transformed image 301 results when a Fourier transform is applied to the image of a net in frame 300-1. Recognizing and comparing transformed image 301 to known characters and glyphs, CRP 30 determines to generate the letter 'A' from transformed image 301, as provided in character shape 302. Character shape 302 includes additional graphics than the image depicted in transformed image 301. When applying the transform that generates transformed image 301, CRP 30 may not always find an image that corresponds to the same visual structure as one of the characters that are being compared. When the structure is determined not to be the same as the character, but the overall image provides a high correlation to one or more of the characters of the existing transforms, CRP 30 may edit the image of transformed image 301 to product character shape 302. In the present example, CRP 30 has joined the leg images in transformed image 301 and added crossbar 305 to generate the letter 'A' from the visual elements found in the visual presentation of the net in frame 300-1. CRP 30 uses the visual elements from the underlying image or transformed image 301 to generate any edits that will be made to transformed image 301. By conforming the edits to the same or similar style as the visual elements of the underlying image or transformed image 301, the entire character of character shape 302 maintains a consistent appearance.

In the presently described example of FIG. 3, CRP 30 also finds an image in another of frames 300, transforms it into transformed image 303 and determines to create the letter 'Q' from this image of a crab, as shown in character image 304. Here again, an entire typeface is generated through analyzing the images on frames 300 of a movie video.

It should be noted that any number of different image delivery systems, whether for still images or video images may be used to generate a typeface according to the various embodiments of the present teachings.

Figure 4:
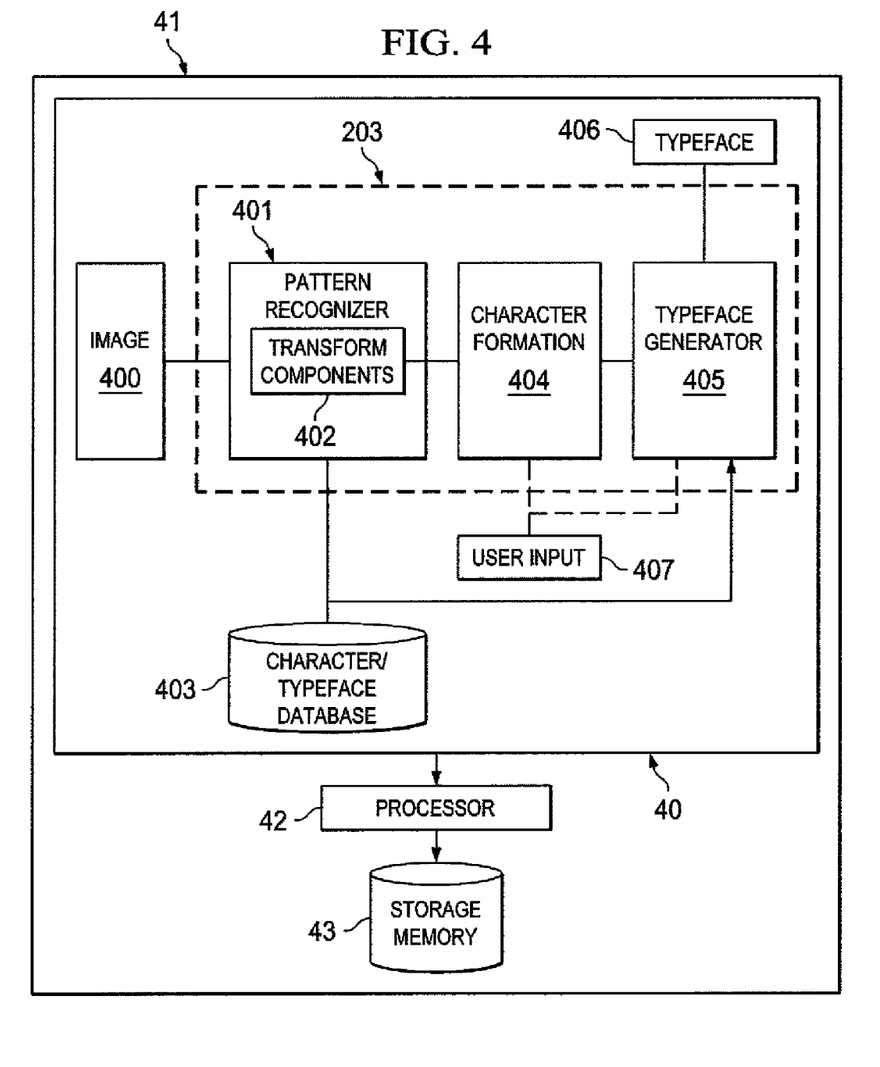
FIG. 4 is a block diagram illustrating a typeface generation application configured according to one embodiment of the present teachings.

FIG. 4 is a block diagram illustrating computer 41 operating typeface generation application 40 configured according to one embodiment of the present teachings. Computer 41 comprises processor 42 and storage 43, which storage represents both internal memory used directly by processor 42 and disk memory, such as a hard drive. Typeface generation application resides in storage 43 of computer 41 and, when executed by processor 42 includes components such as property analyzer 203 and character/typeface database 403. Character/typeface database 403 is associated with typeface generation application 40, but may reside independently on storage 43. Property analyzer 203 further includes pattern recognizer 401. Pattern recognizer 401 also includes transform components 402. During execution, pattern recognizer 401 applies any one or all of the transforms in transform components 402 to image 400 to provide some kind of processed image from which to recognize any one or number of patterns either easily discernable from the face of image 400 or that may be hidden within its subtle patterns. Pattern recognizer 401 accesses character/typeface database 403 for comparing any recognized patterns to the known characters or glyphs within existing typefaces. Using these segments of analysis, the recognized image is formed into a character at character formation 404. In this section, the single letter, number, symbol, punctuation, or the like is set for the single image.

Typeface generator 405 receives the formed character from character formation 404 and begins to analyze the various different typeface properties and characteristics that the formed character has in relation to its equivalent character. These properties and characteristics are used, along with reference to the existing characters and glyphs in character/typeface database 403, to generate all of the characters and glyphs of the entire typeface, typeface 406. Typeface 406 may then be transmitted to the user requesting the typeface, or simply installed into the typeface or font repository of computer 41 to allow the user to select typeface 406 from any number of different available fonts and typefaces stored in storage 43.

In additional and/or alternative embodiments of the presently described example of FIG. 4, the user may supply user input 407 to character formation 404 and/or typeface generator 405 in order to provide changes to the way in which typeface generation application 40 designs the particular character or characters of typeface 406. For example, user input 407 may provide input as drastic as instructing typeface generation application 40 to user another recognized pattern instead of the pattern selected for character formation 404, or as simple as making a slight adjustment to the angle of the character in relation to the baseline. Moreover, user input 407 to typeface generator 405 may include similar input, or may also include additional guidance for how typeface generator 405 should select to present the other characters based on the character processed in character formation 404. Thus, while typeface generation application 40 provides the calculations for pattern recognition, property analysis, and character creation, the user may add customized edits to the typeface characters in order to result in a typeface that is to the design preferences of the user.

Figure 5:
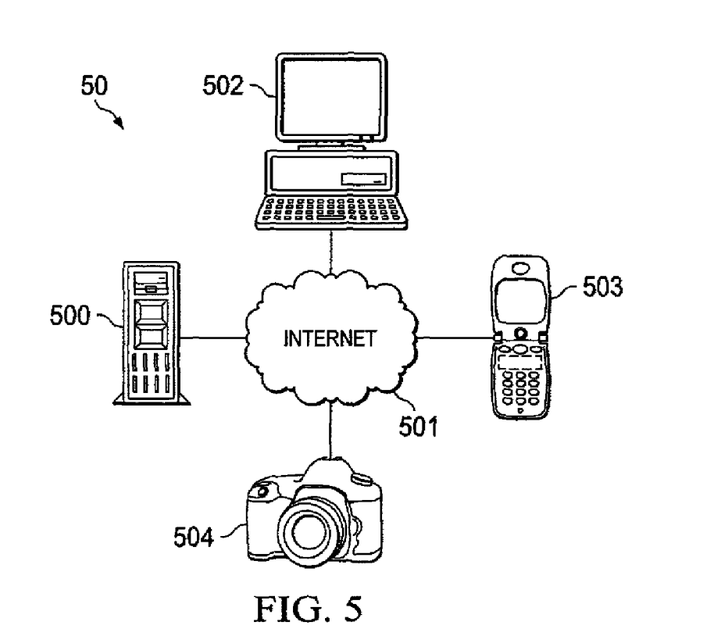
FIG. 5 is a diagram illustrating a typeface generation system configured according to one embodiment of the present teachings.

It should be noted that typeface generation application 40 may be implemented on the desktop computer of an individual user or may be offered as an online service, by offering remote users to transmit image data to a centralized or remote server. FIG. 5 is a diagram illustrating typeface generation system 50 configured according to one embodiment of the present teachings. Typeface server 500 provides the operational logic for generating typefaces from images as described in the examples of FIGS. 1-4. A user at desktop computer 402, mobile phone 503, and wireless-enabled digital camera 504 may create their own typefaces by access the typeface generation service provided by typeface server 500. By accessing typeface server 500 through Internet 501, the users may transmit the images or video data that are to be used to typeface server 500. Typeface server individually analyzes the image information and analyzes the patterning in order to generate typefaces from the images it receives. The resulting typefaces are then transmitted back to the users.

Figure 6:
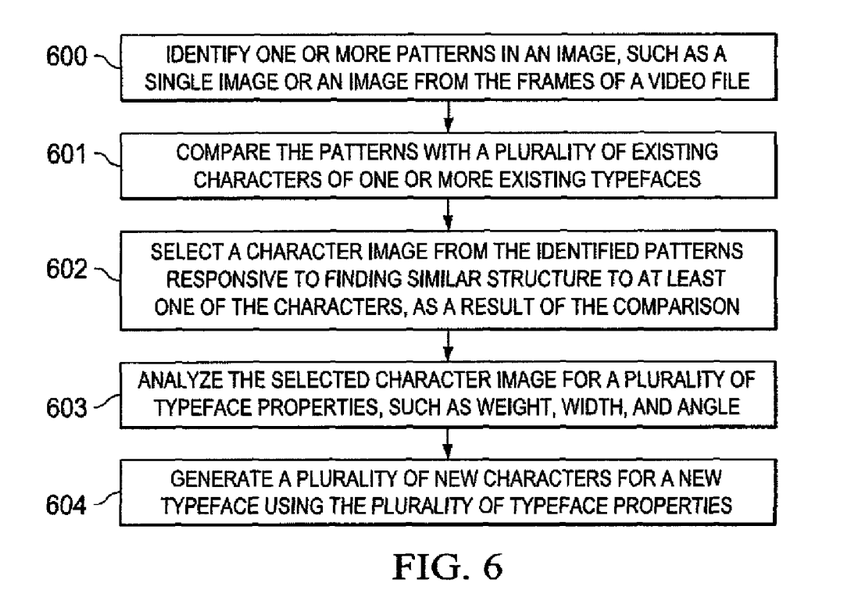
FIG. 6 is a flowchart illustrating example steps executed to implement one embodiment of the present teachings.

FIG. 6 is a flowchart illustrating example steps executed to implement one embodiment of the present teachings. In step 600, one or more patterns are identified in an image, such as a single image or an image from the frames of a video file. The patterns are compared, in step 601, with a plurality of existing characters of one or more existing typefaces. A character image is selected from the identified patterns, in step 602, responsive to finding similar structure to at least one of the characters, as a result of the comparison. The selected character image is analyzed for a plurality of typeface properties, such as weight, width, and angle, in step 603. In step 604, a plurality of new characters are generated for a new typeface using the plurality of typeface properties.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 7:
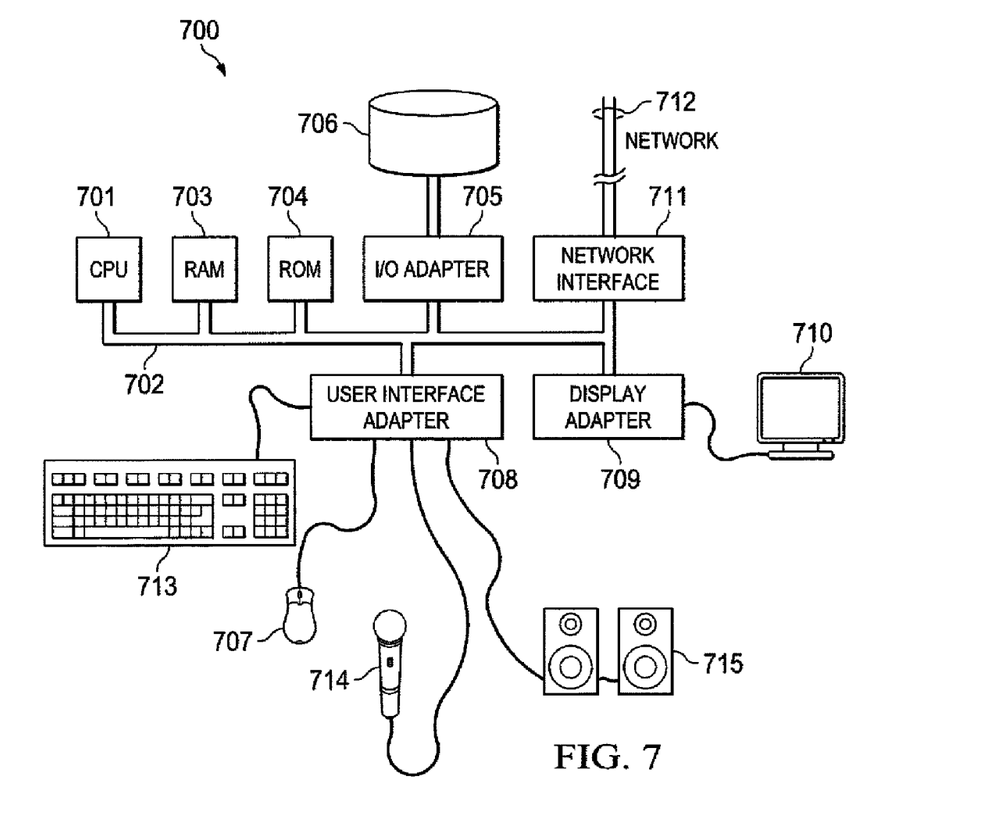
FIG. 7 illustrates an exemplary computer system which may be employed to implement one embodiment of the present teachings.

FIG. 7 illustrates an exemplary computer system 700 which may be employed to implement the typeface generation application or system according to certain embodiments. Central processing unit (CPU) 701 is coupled to system bus 702. CPU 701 may be any general-purpose CPU. The present disclosure is not restricted by the architecture of CPU 701 (or other components of exemplary system 700) as long as CPU 701 (and other components of system 700) supports the inventive operations as described herein. CPU 701 may execute the various logical instructions described herein. For example, CPU 701 may execute machine-level instructions according to the exemplary operational flow described above in conjunction with FIG. 6.

Computer system 700 also includes random access memory (RAM) 703, which may be SRAM, DRAM, SDRAM, or the like. Computer system 700 includes read-only memory (ROM) 704 which may be PROM, EPROM, EEPROM, or the like. RAM 703 and ROM 704 hold user and system data and programs, as is well known in the art.

Computer system 700 also includes input/output (I/O) adapter 705, network interface 711, user interface adapter 708, and display adapter 709. I/O adapter 705, user interface adapter 708, and/or network interface 711 may, in certain embodiments, enable a user to interact with computer system 700 in order to input information, such as interacting with a user interface allowing the user to provide user input, as described above.

I/O adapter 705 connects to storage device(s) 706, such as one or more of hard drive, compact disc (CD) drive, floppy disk drive, tape drive, etc., to computer system 700. Network interface 711 is adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display the image, character image, or resulting typeface characters, as discussed herein.

It shall be appreciated that the present disclosure is not limited to the architecture of system 700. For example, any suitable processor-based device may be utilized for implementing the typeface generation application or system, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method comprising:
   identifying, by a processor, one or more patterns in a non-character image;
   comparing, by the processor, said one or more patterns with a plurality of existing characters of one or more existing typefaces;
   selecting, by the processor, a character image from said one or more identified patterns responsive to said comparing;
   analyzing, by the processor, said selected character image for a plurality of typeface properties; and generating, by the processor, a plurality of new characters for a new typeface using said plurality of typeface properties.

2. The method of claim 1 further comprising;
applying one or more transformations to the non-character image prior to said identifying.

3. The method of claim 2 wherein said one or more transformations comprise one or more of:
a Fourier transform;
a color filter;
a color substituting function;
an image negative function; and
a silhouetting function.

4. The method of claim 1 further comprising:
receiving a video file comprising a plurality of frames;
extracting the non-character image from one of said plurality of frames.

5. The method of claim 4 further comprising:
identifying one or more additional patterns in one or more additional images from others of said plurality of frames;
comparing said one or more additional patterns with said plurality of existing characters;
selecting one or more additional character images from said one or more identified additional patterns responsive to said comparing;
analyzing said selected one or more additional character images for additional typeface properties, wherein said additional typeface properties are added to said plurality of typeface properties.

6. The method of claim 1 wherein said comparing comprises:
comparing said one or more patterns with said plurality of existing characters; and
analyzing a correlation between each said one or inure patterns and said compared plurality of existing characters, wherein said selected character image comprises a pattern of said one or more patterns having a highest of said correlation.

7. The method of claim 6 further comprising:
editing said character image to correspond to a structure of one of said plurality of existing characters with which said character image has said highest correlation, wherein said editing is performed using visual elements similar to visual elements in the non-character image.

8. The method of claim 1 further comprising one or more of:
receiving user input configured to modify said selecting; and
receiving additional user input configured to modify said generating.

9. The method of claim 1 further comprising:
receiving the non-character image over a network connection from a remote location.

10. The method of claim 1 further comprising:
receiving the non-character image from a storage of a local computer.

11. The method of claim 1 wherein said typeface properties comprise:
weight:
width; and
angle.

12. A system comprising:
storage memory coupled to a processor;
wherein the processor is configured to execute a typeface generation application stored in said storage memory, wherein said typeface generation application comprises:
a typeface database stored in said storage memory, wherein said typeface database includes one or more existing typefaces;
a pattern recognizer component configured to analyze a non-character image for one or more patterns, wherein said pattern recognizer component is further configured to compare each of said one or more patterns against a plurality of characters making up said one or more existing typefaces, wherein said pattern recognizer component selects a character image;
a typeface generator component configured to analyze a plurality of typeface characteristics of said character image, wherein said typeface generator component is configured to generate a plurality of new characters for a new typeface using said character image and said plurality of typeface characteristics.

13. The system of claim 12 further comprising:
a network interlace configured to receive the non-character image from a remote user via an Internet connection.

14. The system of claim 12 wherein said typeface generation application further comprises:
one or more transform components stored in said storage memory, wherein said one or more transform components are configured to transform the non-character image prior to analysis by said pattern recognizer component.

15. The system of claim 14 wherein said one or more transform components comprise one or more of:
a Fourier transform;
a color filter;
a color substituting function;
an image negative function; and
a silhouetting function.

16. The system of claim 12 wherein the non-character image comprises one of:
a single image; and
an image from one of a plurality of frames making up a video file.

17. The system of claim 12 further comprising:
an input device coupled to said processor, wherein said input device is configured to accept user input, wherein said user input modification to one of:
said selected character image; and
said plurality of generated new characters.

18. The system of claim 12 further comprising:
a display device coupled to said processor, wherein said display device is configured to display the non-character image, said character image, and said new typeface to a user.

19. The system of claim 12 wherein said typeface generation application further comprises a character formation component configured to edit said character image to provide a visual structure equivalent to said structure of said corresponding one of said plurality of characters.

20. The system of claim 12 wherein said plurality of typeface characteristics comprise:
weight;
width; and
angle.

21. A computer program product having a non-transitory computer readable medium with computer program logic recorded thereon, said computer program product comprising:
code for identifying one or more patterns in a non-character image;

code for comparing said one or more patterns with a plurality of existing characters of one or more existing typefaces;

code for selecting a character image from said one or more identified patterns responsive to results from execution of said code for comparing;

code for analyzing said selected character image for a plurality of typeface properties; and code for generating a plurality of new characters for a new typeface using said plurality of typeface properties.

22. The computer program product of claim 21 further comprising:

code for applying one or more transformations to the non-character image prior to execution of said code for identifying.

23. The computer program product of claim 22 wherein said one or more transformations comprise one or more of:

a Fourier transform;
a color filter;
a color substituting function;
an image negative function; and
a silhouetting function.

24. The computer program product of claim 21 further comprising:

code for receiving a video file comprising a plurality of frames;

code for extracting the non-character image from one of said plurality of frames.

25. The computer program product of claim 24 further comprising:

code for identifying one or more additional patterns in one or more additional images from others of said plurality of frames;

code for comparing said one or more additional patterns with said plurality of existing characters;

code for selecting one or more additional character images from said one or more identified additional patterns responsive to results of executing said code for comparing;

code for analyzing said selected one or more additional character images for additional typeface properties, wherein said additional typeface properties are added to said plurality of typeface properties.

26. The computer program product of claim 21 wherein said code for comparing comprises:

code for comparing said one or more patterns with said plurality of existing characters; and code for analyzing a correlation between each said one or more patterns and said compared plurality of existing characters, wherein said selected character image comprises a pattern of said one or more patterns having a highest of said correlation.

27. The computer program product of claim 26 further comprising:

code for editing said character image to correspond to a structure of one of said plurality of existing characters with which said character image has said highest correlation, wherein said code for editing is executed using graphics similar to visual elements in the non-character image.

28. The computer program product of claim 21 further comprising one or more of:

code for receiving user input configured to modify results of executing said code for selecting; and code for receiving additional user input configured to modify results of executing said code for generating.

29. The computer program product of claim 21 further comprising:

code for receiving the non-character image over a network connection from a remote location.

30. The computer program product of claim 21 further comprising:

code for receiving the non-character image from a storage of a local computer.

\* \* \* \* \*